(12) United States Patent
Xu

(10) Patent No.: US 9,321,023 B2
(45) Date of Patent: *Apr. 26, 2016

(54) FLUID MIXING AND DISTRIBUTION DEVICE AND METHOD FOR MULTIBED REACTORS

(71) Applicant: UOP LLC, Des Plaines, IL (US)

(72) Inventor: Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/299,298

(22) Filed: Jun. 9, 2014

(65) Prior Publication Data

US 2015/0003187 A1    Jan. 1, 2015

Related U.S. Application Data

(60) Provisional application No. 61/840,574, filed on Jun. 28, 2013.

(51) Int. Cl.
*B01F 15/02* (2006.01)
*B01J 8/04* (2006.01)

(52) U.S. Cl.
CPC .............. *B01J 8/0496* (2013.01); *B01J 8/0453* (2013.01); *B01J 8/0492* (2013.01); *B01J 2208/00371* (2013.01); *B01J 2208/00849* (2013.01); *B01J 2208/00893* (2013.01); *B01J 2208/00938* (2013.01)

(58) Field of Classification Search
CPC .............................. B01J 8/0453; B01J 8/0492
USPC .......................................................... 422/607
See application file for complete search history.

(56) References Cited

U.S. PATENT DOCUMENTS

| 4,836,989 A | * | 6/1989 | Aly et al. ................ 422/605 |
| 5,837,208 A | | 11/1998 | Grott |
| 6,180,068 B1 | * | 1/2001 | Boyd et al. ............... 422/606 |
| 8,177,198 B2 | | 5/2012 | Sechrist |
| 8,181,942 B2 | | 5/2012 | Sechrist |
| 2002/0039547 A1 | | 4/2002 | Nelson |
| 2006/0257300 A1 | | 11/2006 | Breivik |
| 2009/0324464 A1 | | 12/2009 | Sechrist |

FOREIGN PATENT DOCUMENTS

WO    2013017804 A1    2/2013

OTHER PUBLICATIONS

PCT International Search Report for PCT/US2014/044245 dated Oct. 20, 2014.
U.S. Appl. No. 14/299,452, filed Jun. 9, 2014, Xu.
U.S. Appl. No. 14/299,373, filed Jun. 9, 2014, Xu.
U.S. Appl. No. 14/299,485, filed Jun. 9, 2014, Xu.
U.S. Appl. No. 14/299,401, filed Jun. 9, 2014, Lesniak.

* cited by examiner

*Primary Examiner* — Tony G Soohoo
*Assistant Examiner* — Elizabeth Insler

(57) ABSTRACT

A device is presented for the collection, mixing and distribution of fluid between reactor catalyst beds. According to various aspects, the device includes a collection tray, a mixing chamber in fluid communication with the collection tray, a rough distribution tray in fluid communication with the mixing chamber, and a fine distribution tray in fluid communication with the rough distribution tray. The mixing chamber includes at least one vapor chimney positioned about the mixing chamber central outlet.

19 Claims, 3 Drawing Sheets

FLUID MIXING AND DISTRIBUTION DEVICE AND METHOD FOR MULTIBED REACTORS

CROSS REFERENCE TO RELATED APPLICATION

This application claims the benefit of U.S. Provisional Application No. 61/840,574 which was filed on Jun. 28, 2013, the contents of which are hereby incorporated by reference in its entirety.

FIELD OF THE INVENTION

This invention relates to co-current flow reactors where a liquid flows with a vapor through a fixed bed of catalyst. In particular, this relates to the internal components for controlling the flow of vapor and liquid through the reactor when there are multiple catalyst beds, and for redistribution of the fluids.

BACKGROUND OF THE INVENTION

A wide variety of processes use co-current flow reactors, where a fluid or fluids flow over a solid bed of particulate materials, to provide for contact between the fluid and solid particles. In a reactor, the solid may comprise a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, hydrocracking and hydrotreating.

Co-current reactors with fixed beds are constructed such that the reactor allows for the fluid to flow over the catalyst bed. When the fluid is a liquid, or liquid and vapor mixture, the fluid is usually directed to flow downward through the reactor. Multibed reactors are also frequently used, where the reactor beds are stacked over one another within a reactor shell. Typically, they are stacked with some space between the beds.

The interbed spaces are often created to provide for intermediate treatment of the process fluid, such as cooling, heating, mixing and redistribution.

In exothermic catalytic reactions, the control of fluid temperature and distribution is important. The temperature and composition of the fluids from an upper catalyst bed and from outside of reactor should be well mixed before being distributed to the lower catalyst bed. Initial poor temperature and composition distribution at top of a catalyst bed can persist or grow as the process fluids move down the reactor. Hot spots can develop and cause rapid deactivation of the catalyst and shorten the reactor cycle length. The space between catalyst beds is for the injection of a quench gas or liquid and for fluid mixing and distribution. In hydrocarbon processing, the quench gas is often a cool hydrogen/hydrocarbon stream. However, cooling a fluid without controlling the mixing and distribution leads to uneven reactions and uneven temperature distribution in subsequent reactor beds. And complex mixing and distribution systems takes up valuable space in a reactor chamber holding multiple catalyst beds.

Due to constraints in the height of the space between reactor beds, there is a limited amount of space for introducing a quench fluid and mixing the vapor and liquid along with the quench fluid. Particularly, for existing hydroprocessing reactors, the space between catalyst beds is already set, and sometimes it is difficult to install new internals for improving mixing and distribution of fluids or for changing feed and process conditions within the existing interbed space without reducing the height of catalyst beds. Even for new reactors, it is often desired to reduce the overall height of the reactors to reduce capital expenditure and the profile of the reactor in a processing plant. Therefore, it is desirable to provide for good mixing and distribution of fluids between adjacent catalyst beds in a relatively short interbed space.

The design of reactors to overcome these limitations can save significantly on the valuable space within a reactor for maximizing catalyst loading. Further, it is often desirable to revamp existing reactors to improve processes with the same or reduced quench zone space between catalyst beds. New reactor internals that improve the utilization of the space within a reactor shell can provide significant cost savings, and allow for revamps of existing reactors to meet new operational and regulatory requirements.

SUMMARY OF THE INVENTION

By one aspect, a device is provided for the mixing and distribution of fluid over the top of a reactor bed. The device includes collection tray having a top and a bottom, and having outlet ports therethrough. A mixing chamber is provided in fluid communication with the collection tray outlet ports and has a mixing chamber outlet. A rough distribution tray is in fluid communication with the mixing chamber outlet and has rough distribution tray liquid outlet ports therethrough. The device also includes at least one vapor chimney within the mixing chamber providing fluid communication between the mixing chamber and the distribution tray therebelow. The vapor chimney has an upper vapor chimney opening positioned within the mixing chamber and above a normal operation liquid level of the mixing chamber.

By another aspect, a mixing device for a downflow reactor is provided. The mixing device includes a mixing chamber having an outer wall, a top, and a bottom. A generally central outlet opening extends through the mixing chamber bottom. At least one inlet of the mixing chamber is positioned radially outwardly of the central outlet opening and at least one vapor chimney is positioned radially between the central outlet opening and the inlet. The vapor chimney includes a chimney upper opening positioned within the mixing chamber above a normal operating liquid level.

By yet another approach, a method for the distribution of fluid over the top of a catalyst bed is provided. The method includes collecting fluid on a collection tray having a top and a bottom, and having outlet ports therethrough. The method also includes passing the liquid and vapor above the collection tray through the outlet ports into a mixing chamber below the collection tray and contacting and mixing the liquid and vapor in the mixing chamber. The method further includes passing at least a portion of the liquid through a generally central outlet of the mixing chamber to a distribution tray therebelow and passing at least a portion of the vapor through a vapor chimney having an upper opening within the mixing chamber radially outward of the mixing chamber outlet to introduce the vapor portion into the distribution tray radially outward of the liquid portion. The method further includes distributing the vapor and liquid below the distribution tray.

Other objects, advantages and applications of the present invention will become apparent to those skilled in the art from the following detailed description and drawings.

DETAILED DESCRIPTION OF THE INVENTION

Figure 1:
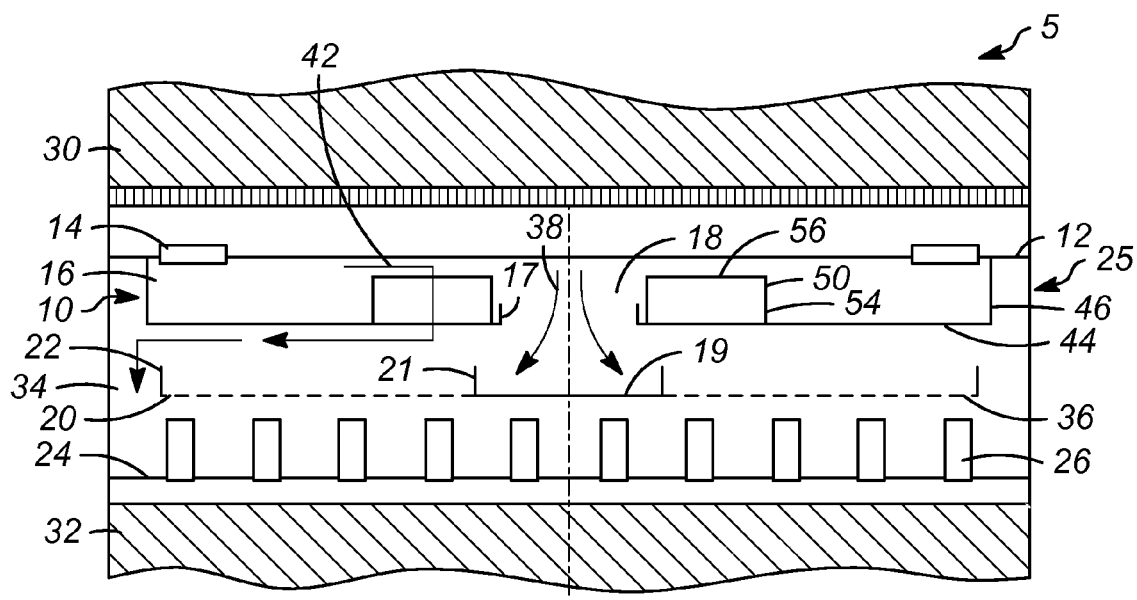
FIG. 1 is a schematic cross-section of a device for the collection, mixing and distribution of fluid between catalyst beds.

According to various aspects, the device and apparatus disclosed herein are disposed in the space between adjacent beds in a co-current flow vessel. For ease of explanation the following will be described in terms of a downflow reactor including two or more spaced catalyst beds, but the mixing devices and system, and methods described herein may also be used in and applied to other hydrocarbon processing vessels having different types of processing beds. The catalyst beds in a reactor are separated by space for quench, fluid contacting and/or mixing and distribution of the fluids to the subsequent bed, where the mixing zones are designed to cool/heat, mix, and sometimes condense effluent fluids from a catalyst bed above. In one example, as illustrated in FIG. 1, the device and apparatus may be included in a hydroprocessing downflow reactor 5 and fluid flows from superior catalyst bed 30 to an inferior catalyst bed 32. The fluid may include vapor, liquid, or a mixture of vapor and liquid. The reactor fluid may be quenched with a quench gas or liquid (collectively referred to as "quench fluid" herein) from a quench fluid distributor (not shown), and the fluid is contacted, mixed and then distributed to the inferior catalyst bed 32. It should be noted that the term "fluid" as used herein refers to either or both of liquid and vapor. The reactor fluid and quench fluid is contacted and mixed to reduce temperature and to minimize temperature and composition differences before being distributed to the inferior catalyst bed 32 below the mixing zone 25. In current systems, there is considerable space between the reactor beds for quench, mixing, and distribution. A reduction in the amount of space needed for these functions can advantageously provide for maximum catalyst loading within the reactor 5 to improve processing and performance without replacing an entire reactor. Similarly, new reactors may be designed with smaller profiles and at smaller capital expense if the height of quench zones is minimized.

Good distribution of fluid over catalyst beds is important to avoid adverse effects, such as uneven temperature rise and hot spots within the catalyst bed. Hot spots occurring in the catalyst beds can lead to a shortened catalyst life or to poor product quality. The methods and devices described herein are designed to reduce the height of mixing zone 25 without sacrificing fluid mixing and distribution performance.

Turning now to FIG. 1, by one aspect a device 10 for the distribution of fluid over the top of a reactor bed 32 is illustrated. The device 10 is for collecting fluid from a first catalyst bed 30 and redistributing the fluid to a second catalyst bed 32 where the first catalyst bed 30 is above the device 10 and the second catalyst bed 32 is below the device 10. The device 10 includes a collection tray 12 and having outlet ports 14, a mixing chamber 16 in fluid communication with the collection tray 12, and having an outlet 18. The device further includes a rough distribution tray 20 in fluid communication with the mixing chamber outlet 18 and having a liquid retention weir 22 at the outer edges of the tray 20. The rough distribution tray may be spaced from the reactor walls 6 to provide a generally annular opening 34 between the liquid retention weir 22 and the reactor walls 6 to facilitate the passage of vapor from above the rough distribution tray 20 to below the rough distribution tray 20. The rough distribution tray 20 also includes a plurality of rough distribution tray outlet ports or openings 36 to provide for the flow of liquid therethrough. The device 10 may also include a fine distribution tray 24 positioned below the rough distribution tray 22. The rough distribution tray 20 is in fluid communication with the fine distribution tray 24. The fine distribution tray 24 has a plurality of outlet ports 26 distributed over the tray 24 for providing uniform distribution of fluid to the inferior catalyst bed 32. The outlet ports 26 may include those generally used for fine distribution trays, including, but not limited to sieve trays, bubble caps, and chimney distributors.

Figure 2:
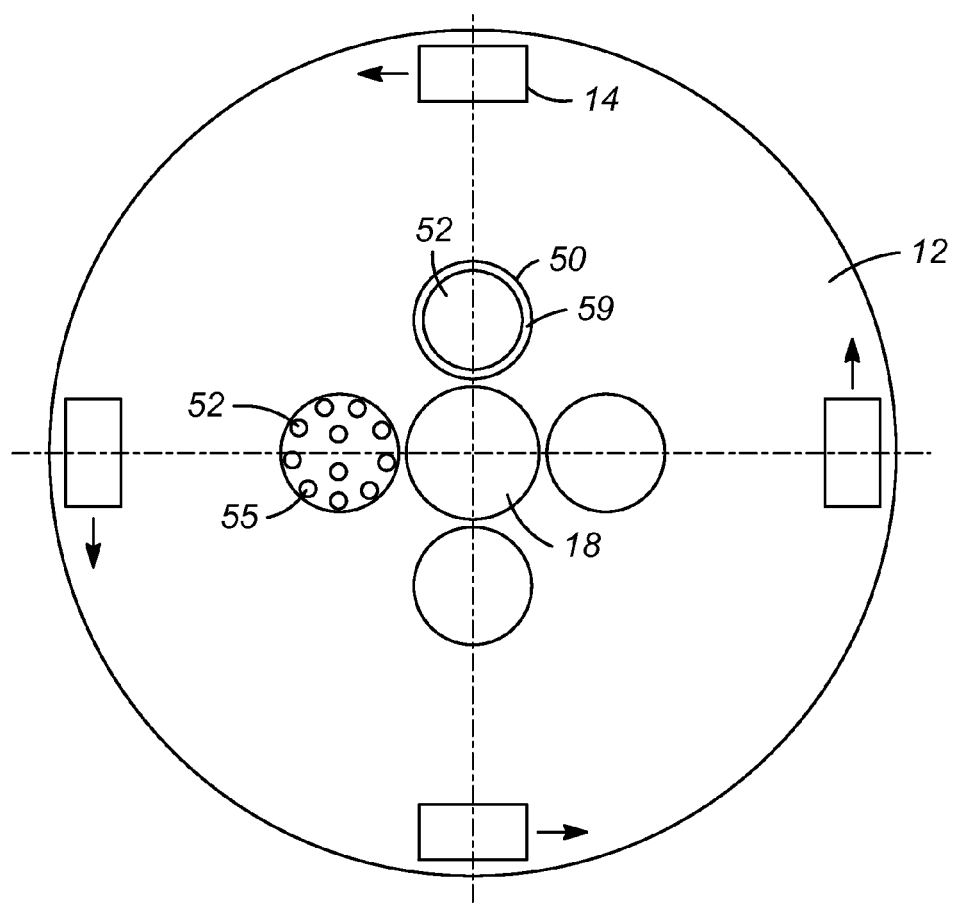
FIG. 2 is a schematic plan view of the arrangement of collection tray outlet ports and vapor chimneys and central opening for mixing chamber in accordance with one approach.

The collection tray 12 includes a plurality of outlet ports 14 for delivering fluid to the mixing chamber, as shown in FIG. 2. The outlet ports 14 can be arrayed circumferentially around the tray 12, with a substantially even spacing. In one approach, there are 4 outlet ports 14. The outlet ports 14 are further designed to deliver the fluid in a direction perpendicular or oblique to the radial direction. The fluid flowing from the outlet ports 14 has a downward and circumferential flow direction as it enters the mixing chamber. The liquid and vapor entering the mixing chamber 16 thus has a swirling motion thereby mixing the fluids within the chamber 16. This creates a process fluid that has a more uniform temperature and composition before redistribution of the liquid and vapor to the catalyst bed 32 below the device 10.

While various mixing chambers may be utilized in accordance with various aspects, as are generally known in the art, in one approach, the mixing chamber 16 may include a bottom plate or tray 44 affixed to the bottom of the collection tray 12 by a sidewall or sidewalls 46. An outlet 18 may be included near or at a center portion of the mixing chamber 16. The sidewalls 46 may include a single continuous sidewall that may be generally round or have another shape. In this regard, the collection tray bottom may form the top of the mixing chamber 16. As illustrated in FIG. 1, the sidewall includes round sidewall 46 to facilitate the swirling fluid flow in the mixing chamber 16. The outlet 18 may comprise a center opening to allow the passage of fluids therethrough, with a weir 17 surrounding the opening to retain a liquid level above the bottom tray 44 during mixing of fluids in the chamber 16.

As process fluid exits the mixing chamber 16 through the outlet 18, the liquid will pass generally downward along path 38 and collect on the rough distribution tray 20 before being distributed through the outlet ports 36. The vapor, on the other hand, is typically intended to flow radially outwardly above the liquid along vapor flowpath 42 toward the annular opening 34 between the rough distribution tray 20 and the reactor walls 6 and to pass below the rough liquid distribution tray 20 through the annular opening 34.

In previous systems, as all of the liquid and vapor passed through a center outlet of the mixing chamber, it has been identified through fluid dynamics studies that the vapor would predominantly flow out of the center of the outlet with the liquid flowing radially outside of the vapor. In this regard, in order to flow radially toward the annular opening vapor exiting the mixing chamber would have to flow radially across the liquid stream. This has been found to cause high turbulence of vapor and liquid flow. It has also been identified to result in excessive liquid entrainment within the vapor in some circumstances as the vapor flows through the liquid radially above the rough liquid distribution tray. Both of these problems result in maldistribution of liquid and vapor on the fine distribution tray and a subsequent degradation in the distribution of fluid to the inferior catalyst bed.

By one aspect, the mixing chamber 16 includes at least one vapor chimney 50 positioned within the mixing chamber for providing fluid communication between the mixing chamber and the rough distribution tray 20 therebelow. It should be noted that while the device is described herein as including the rough distribution tray 20 below the mixing chamber 16, other configurations are contemplated herein, such as, but not limited to, including a splash plate below the mixing chamber 16. In one example, shown in FIG. 1, the rough distribution tray may include a solid center portion 19 and one or more optional baffles or weirs 21 surrounding the center portion 19 to slow the radial flow of liquid along the rough distribution tray 20. In any event, a vapor chimney 50 surrounds a mixing chamber vapor outlet opening 52. The vapor chimney 50 includes a chimney wall 54 that extends up from the mixing chamber bottom tray 44 and includes an upper chimney inlet or opening 56 to provide for passage of vapor into the chimney 50 and through the vapor outlet opening 52. The upper vapor chimney opening 56 may be provided as an open top of the chimney 50 as illustrated in the figures or an aperture through the chimney wall 54. Unless specified, as used herein, upper opening refers to one or more openings that are elevated above a bottom tray and/or liquid level within the mixing chamber, for example the mixing chamber bottom tray 44 or the liquid level within the mixing chamber. The upper vapor chimney opening 56 is preferably positioned at a height above the mixing chamber bottom tray 44 above a normal operating liquid level to restrict liquid from entering the chimney 50 and passing through the vapor outlet 52 with the vapor. In one example, the upper vapor chimney opening 56 is positioned so that at least about 60% of total vapor enters vapor opening 56 and in another example, at least about 80% of the total vapor enters vapor opening 56.

By one aspect, the vapor chimney 50 is positioned radially inwardly of the collection tray outlet ports 14 to facilitate contacting of liquid and vapor within the mixing chamber 16 and to restrict liquid entering the ports 14 from bypassing the mixing chamber 16 and falling directly through the vapor chimneys 50. The vapor chimney 50 is preferably positioned radially outwardly of the mixing chamber outlet 18. In this manner, at least a portion of the vapor within the mixing chamber 16 will pass through the vapor chimneys 50 to the rough distribution tray 20 thereblow rather than passing through the mixing chamber outlet 18 as it flows radially inwardly through the mixing chamber 16 with a swirling motion. As a result, the vapor chimney 50 will be positioned radially outwardly of the liquid exiting the mixing chamber outlet 18 so that it does not pass through the falling liquid. In this regard, the amount of turbulent vapor flow and liquid entrainment within the vapor along the rough distribution tray 20 is reduced. As a result, it has been found that the vertical height of the rough distribution zone between the rough distribution tray 20 and the mixing chamber 16 can be reduced by up to 60%, while providing similar or improved performance. Another benefit of the vapor chimney 50 is more uniform liquid distribution through the rough distribution tray due to more uniform liquid level on the tray and less tendency of liquid being pushed to the outer edge of the tray.

As illustrated in FIG. 2, the mixing chamber outlet 18 may include a generally central outlet opening 18 and a plurality of vapor chimneys 50 may be arrayed circumferentially about the central opening 18. The chimneys may be circumferentially spaced from each other to provide a liquid flow path therebetween.

Figure 3:
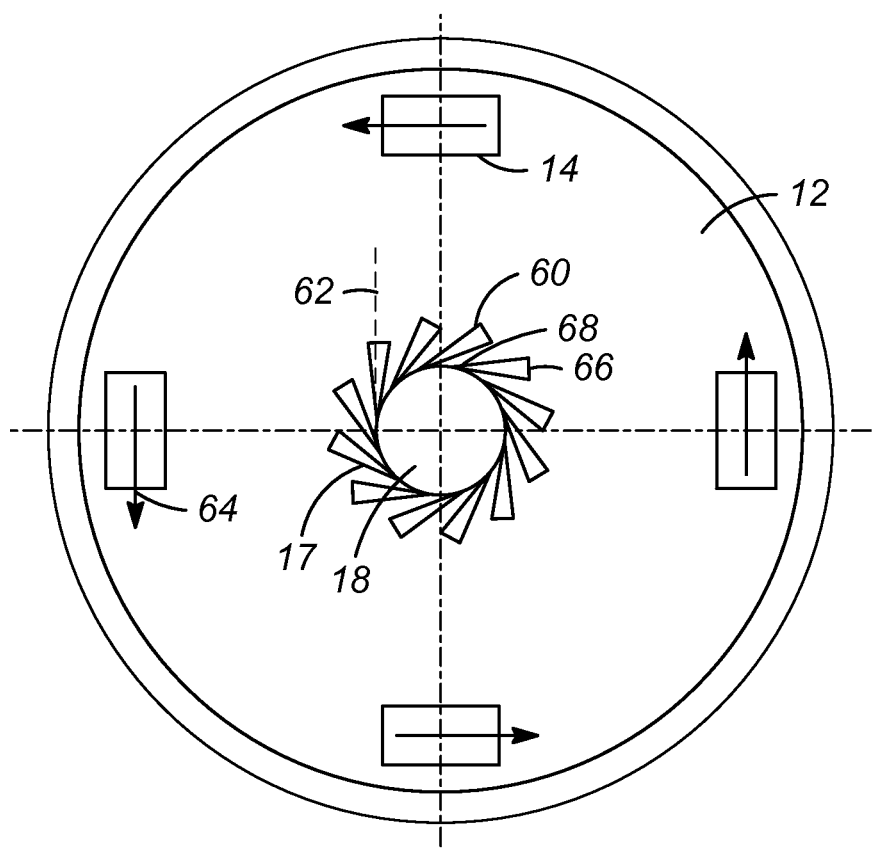
FIG. 3 is a schematic plan view of the arrangement of collection tray outlet ports and vapor chimneys and central opening for mixing chamber in accordance with another approach.
Figure 4:
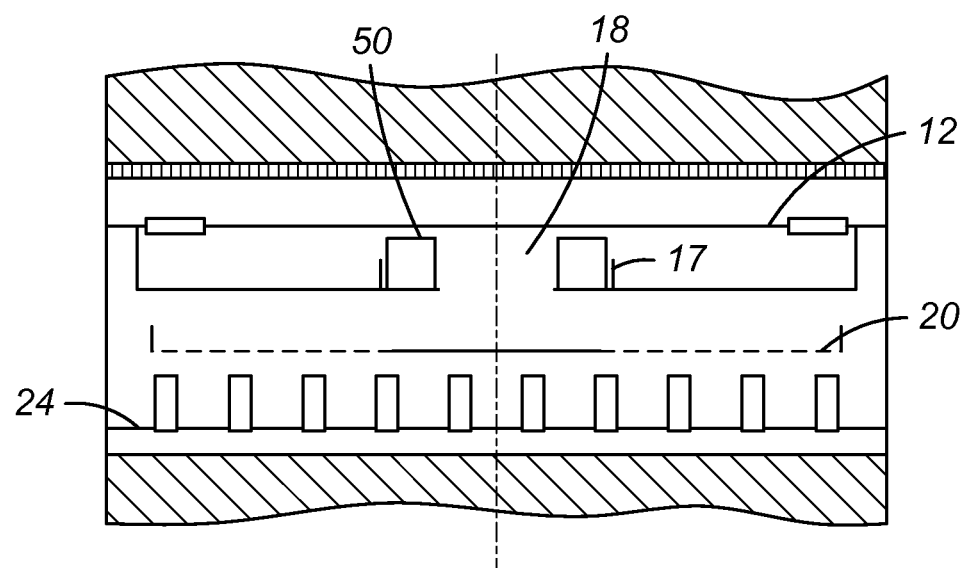
FIG. 4 is a schematic cross-section of a device for the collection, mixing and distribution of fluid between catalyst beds in accordance with another approach.

As mentioned, the mixing chamber 16 may also include a weir 17 about the central outlet opening 18. The weir 17 may be provided for maintaining a minimum liquid level within the mixing chamber 16, although the normal operating liquid level within the mixing chamber 16 may be above the height of the weir. The upper vapor chimney opening 56 will typically be positioned above the upper edge of the weir 17 and above the normal operating liquid level in the mixing chamber 16. By one approach, the weir 17 is positioned radially inward of the vapor chimney 50 as shown in FIGS. 1-3. By another approach the weir 17 is positioned radially outwardly of the vapor chimney 50 as shown in FIG. 4.

Turning now to FIG. 3, by one approach the plurality of vapor chimneys includes a plurality of elongate vapor chimneys 60 positioned about the mixing chamber outlet 18. The elongate vapor chimneys 60 may have a longitudinal axis 62 that is oblique to the radial direction. The vapor chimneys 60 may be spaced from one another to provide a fluid flowpath therebetween. Preferably the longitudinal axis 62 extends generally parallel to the direction of swirling flow of fluid 64 within the chamber 16 to reduce interference with the swirling flow of fluid. By one approach, as shown in FIG. 3, the elongate vapor chimneys 60 may have a radially distal end portion 66 that is wider than a radially proximal end portion 68 (relative to the center opening 18) so that the wider ends partially obstruct liquid flow toward the center opening 18. This may help to maintain a normal operating liquid level within the mixing chamber and also provide a minimum liquid level. In this regard, a weir as described previously may not be provided in accordance with this aspect.

With vapor chimney 50, the mixing chamber outlet 18 is mostly for liquid flow and its diameter can be reduced significantly. The combination of chimney area and mixing chamber outlet area is similar to the mixing chamber outlet area without chimneys, so the fluid mixing volume inside the mixing chamber is close to the design without vapor chimneys inside the mixing chamber.

Turning to more of the particulars, the vapor chimney 50 may extend through the mixing chamber bottom tray 44 or may only extend upwardly therefrom. In this regard, the vapor chimney 50 may include a vapor chimney passageway 59 within the vapor chimney sidewalls 54 that has a generally consistent cross section or a varying cross section. Similarly, the vapor opening 52 through the mixing chamber bottom tray 44 may be similarly sized to the vapor chimney passageway 59 or may include one or more smaller openings 55 arranged within the vapor chimney 50.

The device 10 can also include a quench gas injection into the space between the catalyst beds 30, 32. When there is a quench gas injection, it is preferred to inject the quench gas in the vapor space above the collection tray 12 as is generally known to those of ordinary skill in the art. A cool quench gas may be injected at a position near the center axis, and sprayed in an outward radial direction or near the reactor walls and sprayed in an inward radial direction above the collection tray. The spray contacts the vapor and liquid flowing downward from the reactor bed above the quench zone. Heat transfer between the two gases is generally a matter of gas mixing which depends on the momentum exchange between the two vapor streams. Heat transfer to the liquid is typically through the transfer of heat across the liquid droplet surface area.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A device for the mixing and distribution of fluid over the top of a reactor bed, comprising:
   a collection tray having a top and a bottom, and having outlet ports therethrough;
   a single mixing chamber in fluid communication with the collection tray outlet ports, and having a mixing chamber outlet;
   a distribution tray in fluid communication with the mixing chamber outlet and having liquid outlet ports;
   at least one vapor chimney within the mixing chamber and extending from a bottom of the mixing chamber providing fluid communication between the mixing chamber and the distribution tray therebelow; and
   an upper vapor chimney opening positioned within the mixing chamber and above a normal operation liquid level of the mixing chamber.

2. The device of claim 1, wherein the vapor chimney is positioned radially inwardly of the collection tray outlet ports to facilitate contacting of liquid and vapor within the mixing chamber.

3. The device of claim 1, wherein the vapor chimney is positioned radially outwardly of the mixing chamber outlet so that at least a portion of vapor within the mixing chamber passes through the vapor chimney and is introduced to the distribution tray therebelow radially outwardly of at least a portion of liquid within the mixing chamber that passes through the mixing chamber outlet.

4. The device of claim 1, wherein the mixing chamber outlet includes a generally central opening and the vapor chimney includes a plurality of vapor chimneys positioned radially outwardly of the generally central opening.

5. The device of claim 4, wherein the plurality of vapor chimneys are arrayed circumferentially about the generally central opening.

6. The device of claim 1, wherein the mixing chamber outlet includes a weir extending thereabout for providing a normal operation liquid level in the mixing chamber and wherein the vapor chimney extends to a higher height above a mixing chamber bottom plate than the weir to restrict liquid from entering the vapor chimney.

7. The device of claim 6, wherein the weir is positioned radially inward of the vapor chimney.

8. The device of claim 6, wherein the weir is positioned radially outward of the vapor chimney.

9. The device of claim 1, wherein the at least one vapor chimney includes a plurality of elongate vapor chimneys positioned about the mixing chamber outlet.

10. The device of claim 9, including radially distal end portions of the elongate vapor chimneys that is wider than radially proximal end portions thereof to obstruct a portion of the flow of liquid toward the mixing chamber outlet opening to retain a normal operation liquid level within the mixing chamber.

11. The device of claim 9, wherein the elongate vapor chimneys include a lengthwise dimension that is oblique to the radial direction of the mixing chamber to reduce interference with the swirling flow of fluids within the mixing chamber.

12. A mixing device for a downflow reactor, the mixing device comprising:
    A single mixing chamber having an outer wall, a top, and a bottom
    a generally central outlet opening extending through the mixing chamber bottom;
    at least one inlet of the mixing chamber positioned radially outwardly of the central outlet opening; and
    at least one vapor chimney positioned radially between the central outlet opening and the inlet and extending from the bottom of the mixing chamber and having a chimney upper opening positioned within the mixing chamber above a normal operation liquid level.

13. The mixing device of claim 12, including a plurality of vapor chimneys arrayed circumferentially about the central outlet opening.

14. The mixing device of claim 12, including a weir formed about the central outlet opening for maintaining a normal operation liquid level within the mixing chamber between the weir and the outer wall and wherein a top portion of the vapor chimney extends to a higher height above a mixing chamber bottom plate than an upper end portion of the weir to restrict liquid from passing into the vapor chimney.

15. The device of claim 14, wherein the weir is positioned radially inward of the vapor chimney.

16. The device of claim 14, wherein the weir is positioned radially outward of the vapor chimney.

17. The device of claim 12, wherein the at least one vapor chimney includes a plurality of elongate vapor chimneys positioned about the mixing chamber outlet.

18. The device of claim 17, wherein the elongate vapor chimneys include a lengthwise dimension that is oblique to the radial direction of the mixing chamber to reduce interference with swirling fluid flow within the mixing chamber.

19. The device of claim 17, including radially distal end portions of the elongate vapor chimneys that are wider than radially proximal end portions thereof to obstruct a portion of the flow of liquid toward the mixing chamber outlet opening to provide a normal operation liquid level within the mixing chamber.

* * * * *